US007310660B1

(12) United States Patent
White et al.

(10) Patent No.: US 7,310,660 B1
(45) Date of Patent: Dec. 18, 2007

(54) METHOD FOR REMOVING UNSOLICITED E-MAIL MESSAGES

(75) Inventors: Richard Paul White, Pacific Grove, CA (US); Alan Huang, Menlo Park, CA (US); Haw-minn Lu, San Diego, CA (US); Ira Victor Spivack, Reno, NV (US)

(73) Assignee: Engate Technology Corporation, Reno, NV (US)

( * ) Notice: Subject to any disclaimer, the term of this patent is extended or adjusted under 35 U.S.C. 154(b) by 439 days.

(21) Appl. No.: 10/700,752

(22) Filed: Nov. 3, 2003

Related U.S. Application Data

(63) Continuation of application No. 10/179,446, filed on Jun. 25, 2002, now abandoned.

(51) Int. Cl.
  *G06F 15/16* (2006.01)
  *G06F 12/16* (2006.01)
(52) U.S. Cl. ........................................ 709/206; 726/22
(58) Field of Classification Search ................ 709/206; 726/22
  See application file for complete search history.

(56) References Cited

U.S. PATENT DOCUMENTS

| | | | |
|---|---|---|---|
| 5,283,856 A | 2/1994 | Gross et al. | |
| 5,377,354 A | 12/1994 | Scannell et al. | |
| 5,619,648 A | 4/1997 | Canale et al. | |
| 5,826,022 A | 10/1998 | Nielsen | |
| 5,999,932 A | 12/1999 | Paul | |
| 6,023,723 A | 2/2000 | McCormick et al. | |
| 6,052,709 A | 4/2000 | Paul | |
| 6,112,227 A | 8/2000 | Heiner | |
| 6,199,102 B1 | 3/2001 | Cobb | |
| 6,321,267 B1 | 11/2001 | Donaldson | |
| 6,460,050 B1* | 10/2002 | Pace et al. | ................ 707/104.1 |
| 6,650,890 B1 | 11/2003 | Irlam et al. | |
| 6,654,787 B1 | 11/2003 | Aronson et al. | |
| 6,868,498 B1* | 3/2005 | Katsikas | ........................ 726/14 |
| 6,941,348 B2* | 9/2005 | Petry et al. | .................. 709/206 |
| 6,965,919 B1* | 11/2005 | Woods et al. | ................ 709/206 |
| 6,996,606 B2* | 2/2006 | Hasegawa | .................... 709/206 |
| 7,016,939 B1* | 3/2006 | Rothwell et al. | ............ 709/206 |
| 2002/0162025 A1* | 10/2002 | Sutton et al. | ................ 713/201 |
| 2002/0181703 A1* | 12/2002 | Logan et al. | .................. 380/30 |
| 2002/0199095 A1* | 12/2002 | Bandini et al. | .............. 713/151 |
| 2003/0009698 A1* | 1/2003 | Lindeman et al. | ........... 713/201 |

\* cited by examiner

*Primary Examiner*—Larry D. Donaghue

(57) ABSTRACT

A set of unsolicited e-mail messages is collected and "finger printed" by either sampling the unsolicited message and using portions of the samples to form the identifier or by hashing a portion of the message. These "finger prints" are used to construct an unsolicited message database. The client's e-mail messages are processed in off-line manner by periodically fetching their messages; "finger printing" each message in a manner identical to the unsolicited messages; checking to see if the "finger print" is in the unsolicited message database; discarding any messages with a "finger print" in the unsolicited message database; and forwarding any message with a "finger print" not in the unsolicited message database to the "clean" POP server. The client's e-mail messages can also be processed in a on-demand manner by intercepting their "clean" POP server request; fetching their mail from their "dirty" POP; "finger printing" each message in an manner identical to the unsolicited messages; checking to see if the "finger print" is in the unsolicited message database; forwarding any message with a "finger print" not in the unsolicited e-mail database to the "clean" POP server; and passing the intercepted POP request to the "clean" POP.

7 Claims, 8 Drawing Sheets

From: The DON
Sent: Monday, April 29, 2002 8:32 AM
Subject: Discover the Secrets to Finding a Partner Dating Guide Books
For Men & Women Discover the Secrets to Love Is your social dating life everything you want it to be?

These two new books: How To Get Women & How To Get Men will give you the tools and information you need to get your love life on the fast track to success.

These modern dating guides provide you with the up-to-date, practical advice you can begin to use immediately to dramatically increase your success in the dating game .

Don't hesitate! Take control and make the change today! Your social life can be what you want it to be by using these proven techniques. Visit us today:
"...the most amazing information ever published."
and much, much more!
Click Here For Information
[K82X132E93R90D80K77B74Y97R85E77P82X89L81G75L78Q81M78C70]

| unsolicited message identifier | yes / no |
|---|---|
| | |
| | |
| | |

Fig. 5

| unsolicited message identifier | unsolicited message | time stamp |
|---|---|---|
| | | |
| | | |
| | | |
| | | |

Fig. 6

| clean POP client login | clean POP client password | dirty POP client address | dirty POP client login | dirty POP client password |
|---|---|---|---|---|
| | | | | |
| | | | | |
| | | | | |
| | | | | |

Fig. 7

| clean POP client login | timestamp | deleted message identifier |
|---|---|---|
| | | |
| | | |
| | | |
| | | |

Fig. 8

| message identifier | message file pointer | timestamp |
|---|---|---|
| | | |
| | | |
| | | |
| | | |

Fig. 9

METHOD FOR REMOVING UNSOLICITED E-MAIL MESSAGES

RELATED APPLICATIONS

This application is a continuation of application Ser. No. 10/179,446 entitled "A Method for Removing Unsolicited E-Mail Messages", filed on Jun. 25, 2002 now abandoned, which is incorporated herein by reference in its entirety.

BACKGROUND

1. Field of Invention

This invention relates to the removal of unsolicited e-mail messages, commonly known as SPAM, from a client's e-mail.

2. Discussion of Prior Art

E-mail has become a very important means of communications. Unfortunately, unsolicited e-mail messages, commonly referred to as SPAM, is cluttering this communications channel. This unsolicited e-mail wastes time, storage space, and communications bandwidth. This translates into lost productivity and increased computing and communication costs. Some of these unsolicited messages are also offensive. They are clearly directed at an adult audience; unfortunately, there is nothing to protect minors from receiving this material.

One approaches to this problem involves setting up keyword filters in a browser to detect messages with works such as "porn" or "sex." This defense is easily defeated by using variation such as "*PORN**" or "_Sex_".

Another approach to this problem involves setting up filters in the browser to block messages from the return address of the unsolicited e-mail. This defense is not effective since the SPAMer usually use a false return address.

Another approach would be to compare each incoming message again a set of unsolicited e-mail messages. Unfortunately, this is quite computationally expensive.

DESCRIPTION OF DRAWINGS

FIG. 2 shows an example of an unsolicited e-mail message which has been sampled (sampled characters are underlined and shown in bold).

FIG. 3 shows how the sampled portions of the message are used to construct an identifier or "finger print."

FIG. 5 shows the data structure of the unsolicited e-mail membership database.

FIG. 6 shows the data structure of the unsolicited message database.

FIG. 7 shows the data structure for a client database.

FIG. 8 shows the data structure for the deleted unsolicited message database.

FIG. 9 shows the data structure for the previously processed message database.

SUMMARY

A set of unsolicited e-mail messages is collected. Each unsolicited e-mail message is "finger printed" to produce an identifier. The "finger printing" can be accomplished by sampling the message and using portions of the samples to form an identifier. The "finger printing" can also be accomplished by hashing a portion of the message and using the result as an identifier. These "finger prints" or identifiers are used to construct an unsolicited message database.

The client's e-mail messages are processed in off-line manner by periodically fetching their messages; "finger printing" each message in a manner identical to the unsolicited messages; checking to see if the "finger print" is in the unsolicited message database; discarding any messages with a "finger print" in the unsolicited message database; and forwarding any message with a "finger print" not in the unsolicited message database to the "clean" POP.

The client's e-mail messages are processed in a on-demand manner by intercepting their "clean" POP request; fetching their mail from their "dirty" POP; "finger printing" each message; checking to see if the "finger print" is in the unsolicited message database; forwarding any message with a "finger print" not in the unsolicited e-mail database to the "clean" POP; and then passing the intercepted POP request to the "clean" POP.

DESCRIPTION OF INVENTION

Figure 1:
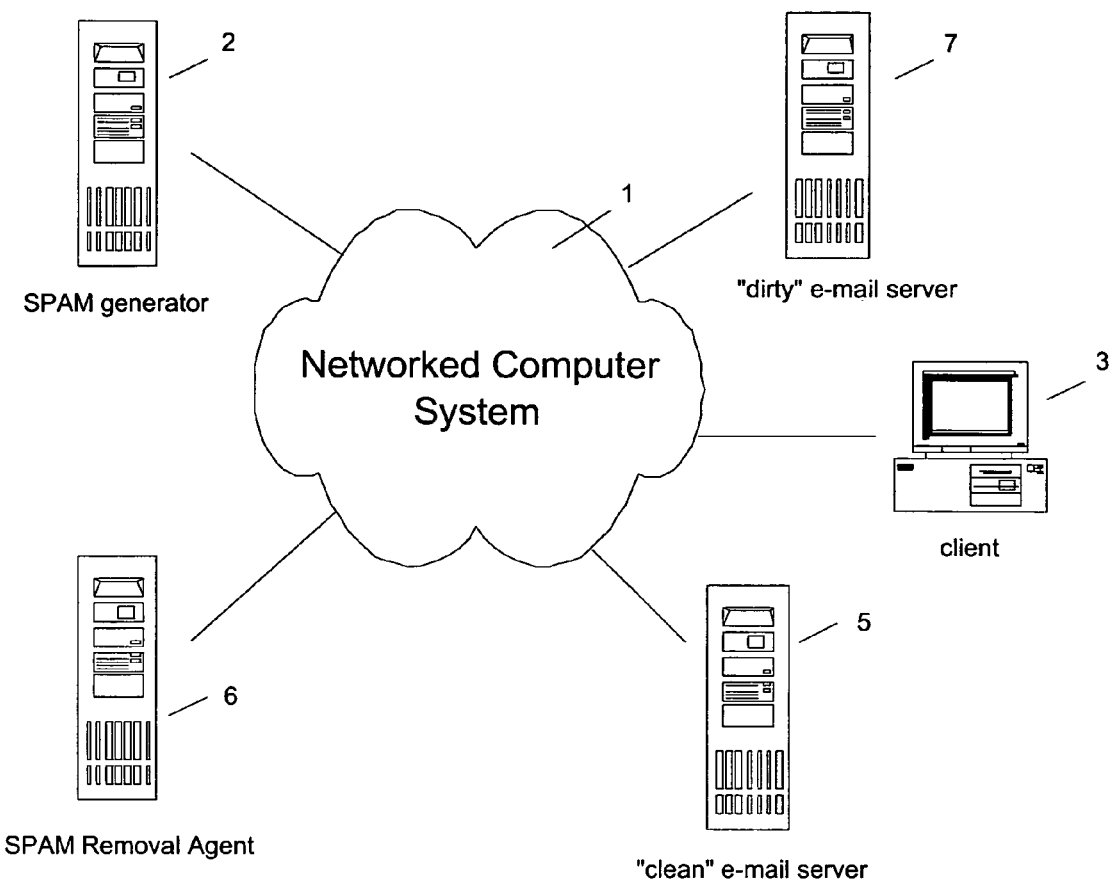
FIG. 1 shows a block diagram of the unsolicited e-mail message removal process.

For purposes of illustration, a computer network, 1; an unsolicited e-mail (SPAM) generator, 2; a client, 3; a client, and a "dirty" e-mail server, 4 are shown in FIG. 1.

Currently, the unsolicited e-mail generator, 1, generates e-mail and sends it to various blocks of IP addresses. The "dirty" POP e-mail server, 4, receives the client's valid e-mail along with the unsolicited e-mail. The client, 3, then fetches the valid and unsolicited e-mail from the "dirty" POP e-mail server.

In our new approach, we add a "clean" POP e-mail server, 5, and a SPAM removal agent, 6. The SPAM removal agent, 6, down loads the client mail from the "dirty" POP e-mail server, 7, removes all the unsolicited e-mail that it can find; and sends the scrubbed e-mail to the "clean" POP e-mail server, 5. The "clean" POP e-mail server holds the client's scrubbed e-mail. The client. 3, then fetches his e-mail from the "clean" POP e-mail server, 5, rather than the "dirty" POP e-mail server, 7.

Our approach detects unsolicited e-mail messages by comparing the "finger print" of a client e-mail message with the "finger prints" of a set of un-solicited e-mail messages.

This is accomplished by first gathering a set of unsolicited e-mail messages. One approach to accomplishing this is to setup "honey pots." These "honey pots" are e-mail address which have no purpose other than to collect unsolicited e-mail. There are some websites, such as spamhaus (http://www.spamhaus.org/sbl/latest.lasso), spews.org (http://www.spews.org/faq.html), and dsbl.org (http://dsbl.org/usage.html) which collect and report unsolicited e-mail.

Figure 4A:
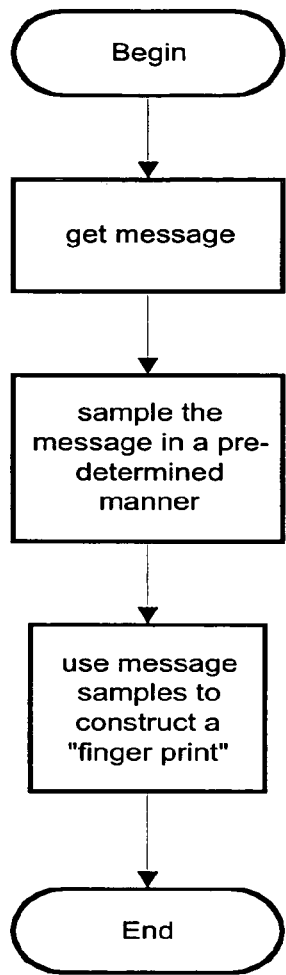
FIG. 4A shows an algorithm for constructing a message identifier based on sampling a portion of the message.

The unsolicited e-mail messages are then "finger printed" to create an identifier. There are two basic approaches creating this identifier or "finger print." One approach based on sampling the message is shown in FIG. 4A. The message is first fetched. It is then sampled in a pre-determined manner. A portion of the sampled portion of the e-mail is then used to construct an identifier or "finger print" in a pre-determined manner.

Figures 2, 3:
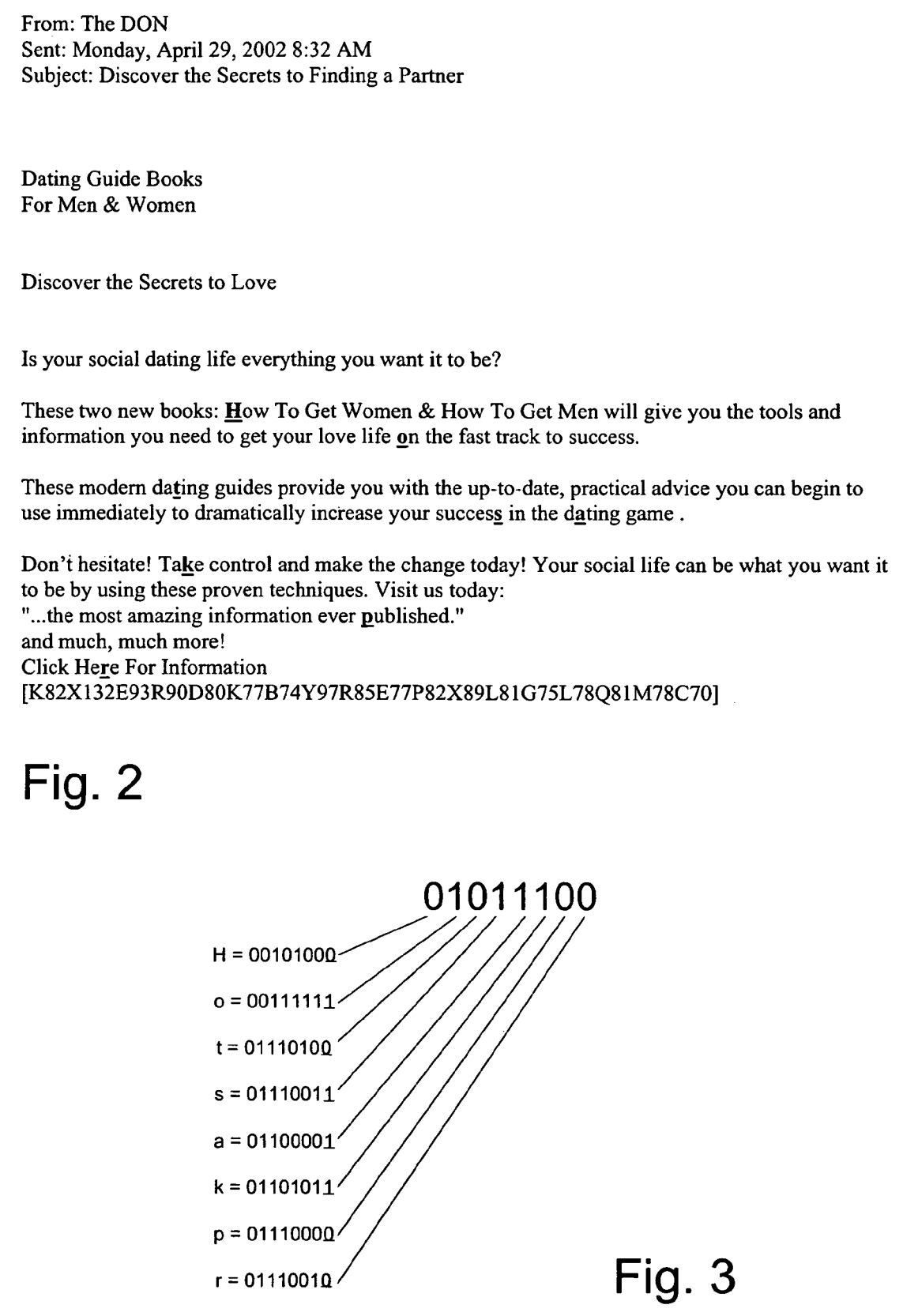

An example of this approach is shown in FIG. 2. The message is sampled in a pre-determined manner. In this particular case the pre-determined sampling technique selects characters 267, 376, 324, 454, 463, 496, 670, and 721 in the message. The sampled characters, "H," "o," "t," "s," "a," "k," "p," and "r" are shown in bold and underlined in FIG. 2. The ASCI equivalents to these sampled characters are 00101000, 00111111, 01110100, 01110011, 01100000, 01101011, 01110000, and 0111001 respectively are shown in FIG. 3. A pre-determined portion of the sampled characters are then selected. In this particular example, the least significant digit of all the sampled characters. The least significant binary digits of these sampled characters are 0, 1, 0, 1, 1, 1, 0, and 0 respectively. The least significant binary digits are assembled in a pre-determined manner. In this particular case, the digits are assembled in the order in which they were sampled. The assembled identifier is 01011100 as shown in FIG. 3.

The location of the sampled characters in the sample based e-mail "finger printing" as shown in FIG. 4A is arbitrary but pre-determined and fixed. It just has to be applied to all the real and unsolicited e-mail. There is an advantage to skipping over the "To, "From," and "Subject" lines of the message since the SPAMers sometimes change these lines to avoid detection. Any number of characters may be sampled. The more characters sampled the more unique the identifier and the lower the probability of a false positive. In this particular case the eight samples will generate an eight bit identifier which has a 1 in $2^8$ probability of being unique. It is best to use the least significant binary bit of the sampled characters to construct the identifier since they are the most random. The pre-determined manner in which the portions of the sampled characters are assembled to form an identifier is arbitrary.

Figure 4B:
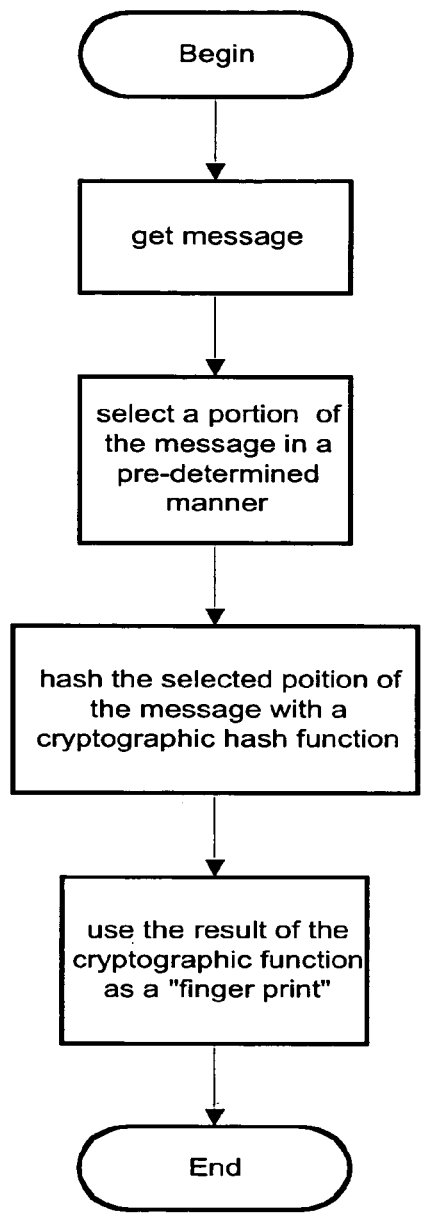
FIG. 4B show an algorithm for construction a message identifier based on hashing a portion of the message.

A second approach to creating a e-mail message "finger print" or identifier based on hashing is shown in FIG. 4B. The message is first fetched. A portion of the message is then hashed with a cryptographic hash function such as MD5 or SHA-1. The hash result is then used as the message "finger print" or identifier. The larger the portion of the message hashed the more unique the resulting identifier and the lower the probability of a false positive.

Figure 10:
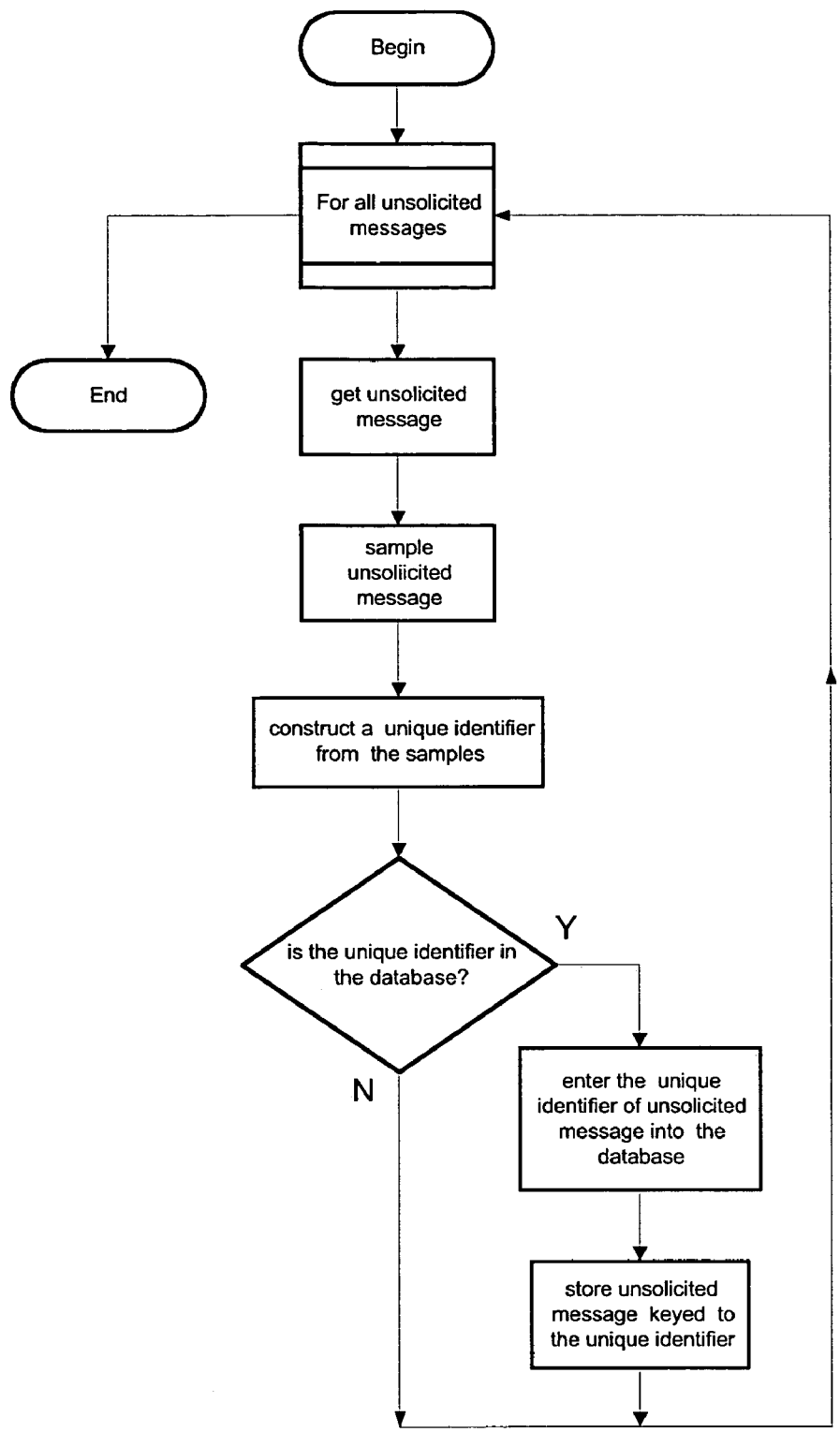
FIG. 10 shows an algorithm for entered an identifier into the unsolicited e-mail membership database.

An unsolicited message membership database is then constructed as shown in FIG. 10. A unsolicited e-mail message is fetched. The unsolicited e-mail is then "finger printed" to create an identifier. The identifier is then added to the unsolicited e-mail membership database. The data structure of the unsolicited e-mail membership database is shown in FIG. 5 and consists of an address field based on the identifier and a one bit field indicating yes or no membership. The unsolicited e-mail message, message identifier, and a time stamp are then stored for future reference in a unsolicited message database as shown in FIG. 6. This process is then repeated for all the unsolicited e-mail messages which have been gathered.

As an example, the eight bit identifier generated in FIG. 3 could be entered into a 256×1 bit unsolicited e-mail membership database. Given a 32 bit computer word, this database could be stored into an 8 word table. The left most three bits of the identifier could be used as the word address and the right most 5 bits of the identifier could be used to identify the bit within the word. The bit could be set to 1 to indicate membership and 0 to indicate non-membership.

Any type of database can be used, however it is advantageous to keep the unsolicited e-mail membership database as compact as possible. This will allow the database to be kept within memory and thus speed up access.

Figure 11:
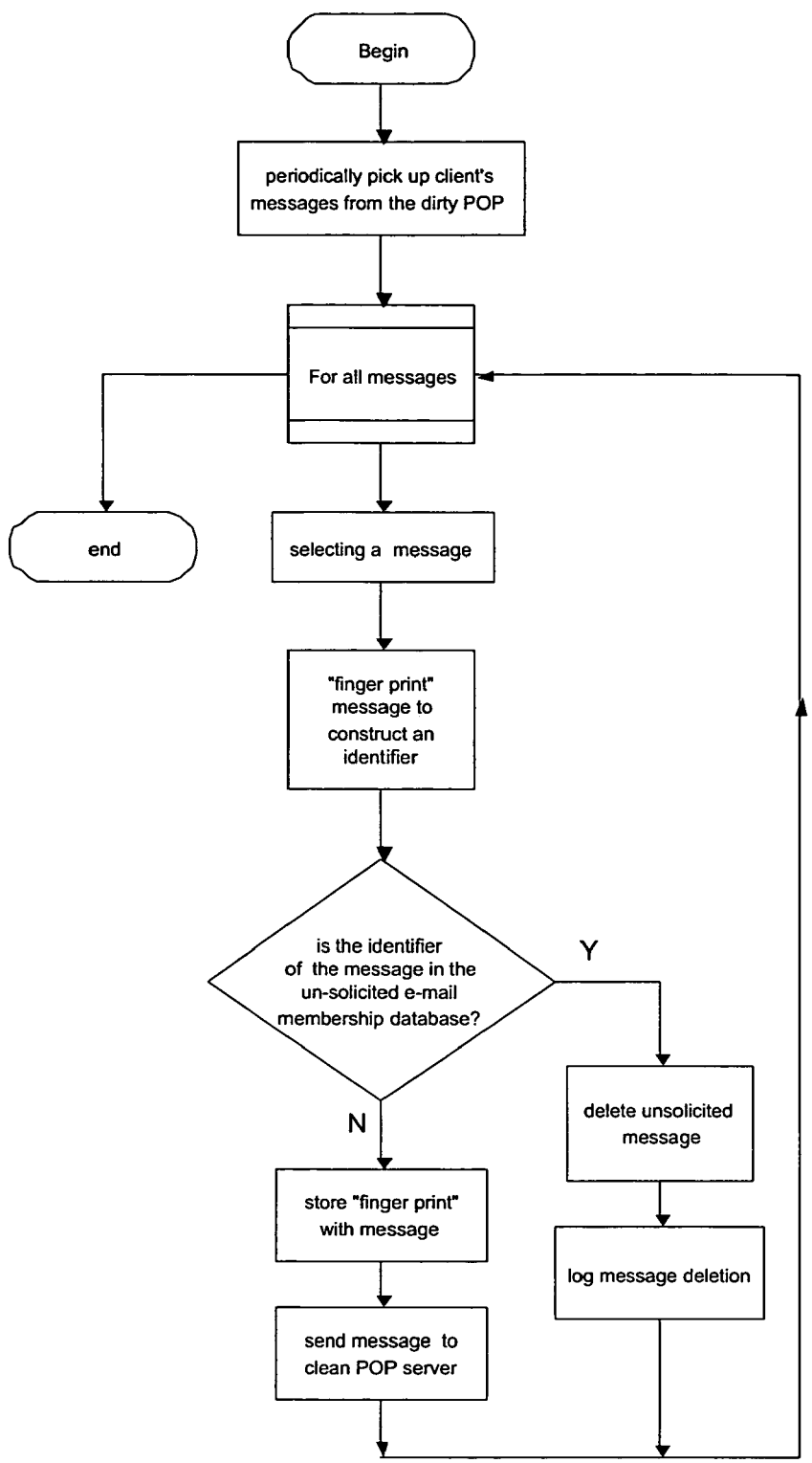
FIG. 11 shows an algorithm for off-line method for removing unsolicited e-mail from a client's e-mail.

A flowchart describing an off-line process for removing unsolicited e-mail messages from a client's e-mail is shown in FIG. 11. The process begins by fetching the client's e-mail from the client's "dirty" e-mail server (POP). This is accomplished by looking up the client's "dirty" e-mail server's IP address, login, and password in the client database shown FIG. 7. The client's "dirty" POP IP address, login, and password are then used to fetch the client's "dirty" e-mail messages.

All the fetched "dirty" client e-mail messages are then processed in the following manner.

A message is selected. The selected message is "finger printed" and an identifier is constructed. The identifier is checked for membership in the unsolicited e-mail membership database. If the identifier is found to be in the database then the selected message is deleted and client's "clean" POP login, the deleted message identifier, and a time stamp are saved in the deleted unsolicited message database shown in FIG. 8. If the identifier is not found to be in the unsolicited e-mail membership database then the "finger print" identifier is stored in association with the message. This can be accomplished by appending the identifier to the message or storing the message identifier, message file pointer, and time stamp in the previously examined message database shown in FIG. 9. The message is sent to the "clean" POP server.

Figure 12:
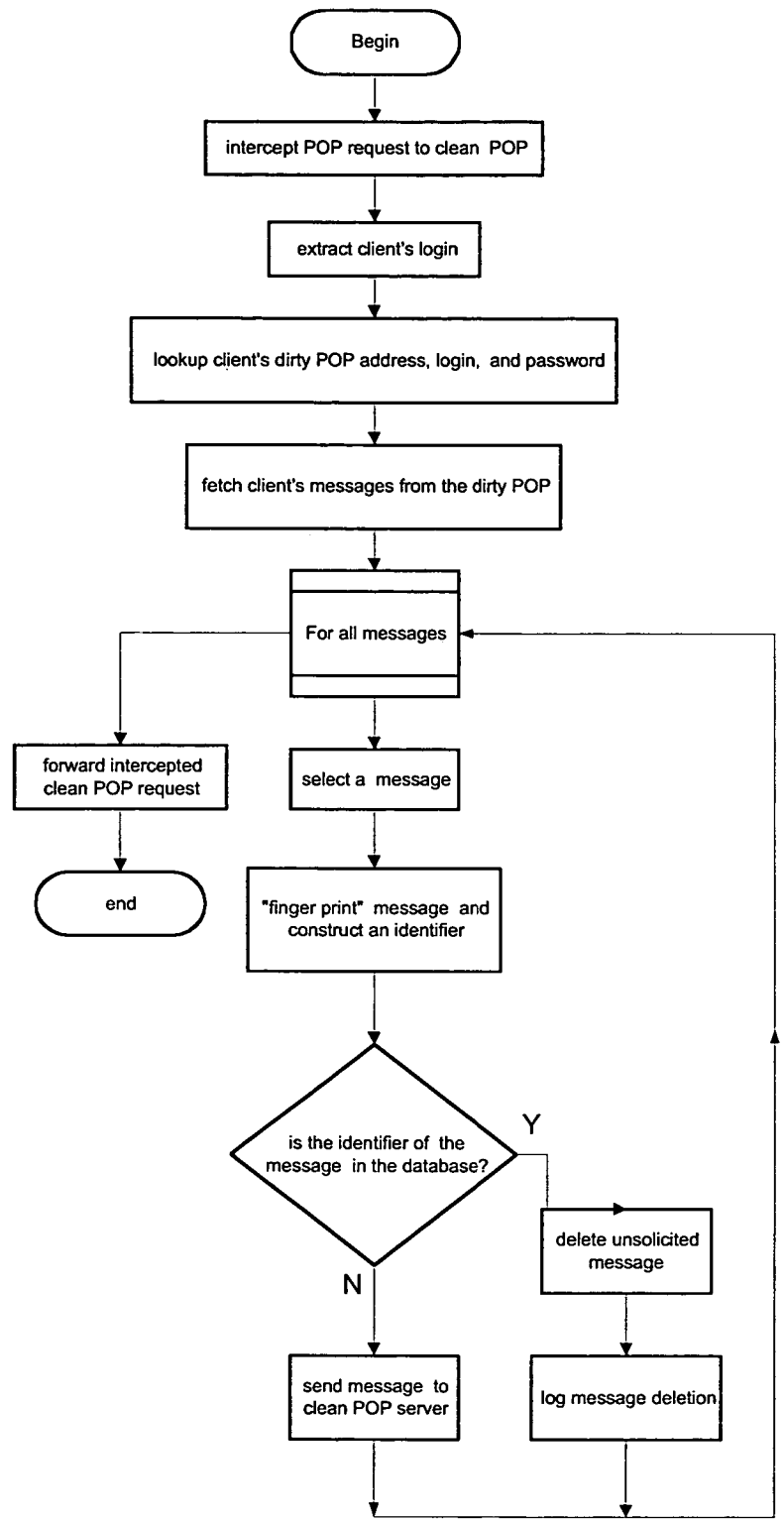
FIG. 12 shows an algorithm for an on-demand method for removing unsolicited messages from a client's e-mail.

The previously examined message database shown in FIG. 9 can be used at a later time to compare the message against the finger prints of unsolicited e-mail messages that have been received in the interim. This eliminates the need to re-compute the finger print identifier of the message A flowchart describing an on-demand process for removing the unsolicited e-mail messages from a client's e-mail is shown in FIG. 12. The process begins by intercepting a client request to the "clean" POP e-mail server. The client's "clean" e-mail server login are extracted from this request. The client's "clean" e-mail server login is used to access the client's "dirty" POP IP address, login, and password from the client database shown in FIG. 7. The client's "dirty" POP IP address, login, and password is used to fetch the client's e-mail messages from the client's "dirty" POP e-mail server.

All the fetched "dirty" client messages are then processed in the following manner. A message is selected. The selected message is "Finger printed" and an identifier is constructed. The identifier is checked for membership in the unsolicited message membership database. If the identifier is in the unsolicited message membership database then the message is deleted and the client's "clean" POP login, deleted message identifier, and time stamp are saved in the deleted message database shown in FIG. 8. If the identifier is not in the unsolicited message membership database then the message is then sent to the "clean" POP e-mail server. The previously intercepted "clean" POP e-mail server request is then forwarded to the "clean" POP e-mail server.

There is no need to use the previously examined database as shown in FIG. 9 since these messages will be immediately forwarded to the client by the "clean" POP server and will not be available to be re-examined at a later time.

The deleted unsolicited message database as shown in FIG. 8 shows which unsolicited messages have been deleted for which client. This information can be used for billing.

One advantage that both the off-line and the on-demand unsolicited e-mail processes have is that client does not have to change their e-mail address or install any software. They only have to change the IP address of their POP server. Another advantage is looking up the "finger print" identifier in the unsolicited e-mail membership database requires considerably less computation than comparing the client's message against the entire pool of unsolicited messages. Another advantage is that detailed records of the deleted messages are available for billing purposes.

The difference between the off-line and the on-demand approach to processing a client's unsolicited e-mail is that the off-line approach can process the "dirty" e-mail at its leisure and thus spread the computational load whereas the on-demand approach has to process the "dirty" e-mail while the client is waiting.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

We claim:

1. A method for removing unsolicited messages from a client's email in a networked computer system in an off-line manner
   where the networked computer system has a dirty POP email server to which the client's email is sent,
   where the networked computer system has a clean POP email server from which the client fetches their mail,
   where the networked computer system has a client database with the client's dirty POP server address, dirty POP login, and dirty POP password, clean POP login, and clean POP password are stored,
   where the networked computer system has a unsolicited message database in which the unsolicited messages and the message identifier are stored, and
   where the networked computer system has a computer system capable of executing the method
   comprising the steps of:
   a) picking up the client's email messages from the dirty POP email server using the POP address, POP login, and POP password from the client database,
   b) selecting a message
   c) "finger printing" the message to form an identifier,
   d) checking to see if the identifier is in the unsolicited message database,
   e) deleting the message if the identifier is in the unsolicited message database,
   f) sending the message to the clean POP email server if the identifier is not in the unsolicited message database, and
   g) repeating steps b) through f) for all the client's messages.

2. The method in claim 1 where the networked computer system further includes a deleted unsolicited message database which records the client's clean POP login, the time, date, and the identifier of the deleted unsolicited message, and wherein the method further includes the step:
   f1) logging the client's clean POP login, the time, the date, and the identifier of the deleted message in the deleted unsolicited message log file if the identifier is in the unsolicited message database,
   inserted between steps f) and g).

3. The method in claim 1 where the networked computer system further includes a previously examined message database and wherein the method further includes the step:
   f2) storing the identifier and message file pointer in a previously examined database if the identifier is not in the unsolicited message database,
   inserted between steps f) and g).

4. A method for removing unsolicited messages from a client's email in a networked computer system in an on-demand manner
   where the networked computer system has a dirty POP email server to which the client's email is sent,
   where the networked computer system has a clean POP email server from which the client fetches their mail,
   where the networked computer system has a client database with the client's dirty POP server address, dirty POP login, dirty POP password keyed to the client's clean POP login,
   where the networked computer system has a unsolicited message database in which the identifiers associated with a set of unsolicited messages has been stored, and
   where the networked computer system has a computer system capable of executing the method
   comprising the steps of:
   a) intercepting the client's POP email server request to the clean POP server,
   b) extracting the client's login from the clean POP server request,
   c) looking up the client's dirty POP address, dirty POP login, and dirty POP password using the client's clean POP login and the client database,
   d) fetching the clients email messages from the dirty POP server using the client's POP login and POP password,
   e) selecting a message,
   f) "finger printing" the message to form an identifier,
   g) checking to see if the identifier is in the unsolicited message database,
   h) deleting the message if the identifier is in the unsolicited message database,
   i) sending the message to the clean POP email server if the identifier is not in the unsolicited message database,
   j) repeating steps e) through i) for all the client's messages, and
   k) sending the client's intercepted POP server request to the clean POP email server.

5. The method in claim 4 where the networked computer system further includes a deleted unsolicited message database which records the client's clean POP login, the time, date, and the identifier of the deleted unsolicited message, and wherein the method further includes the step:
   h1) logging the client's clean POP login, the time, the date, and the identifier of the deleted message in the deleted unsolicited message log file if the identifier is in the unsolicited message database,
   inserted between steps h) and i).

6. A spam removal agent comprising:
   a computer system comprises a finger printing means;
   a client database comprising a plurality of dirty POP server addresses, a plurality of dirty POP logins, and a plurality of dirty POP passwords keyed to a clean POP login; and
   an unsolicited message database;
   wherein the computer system retrieves a message from a dirty POP server by retrieving the POP server address, the POP login and the POP password from the client database, applies the finger printing means to the message to generate an identifier, compares the identifier to the unsolicited message database, and deletes the unsolicited message from the dirty POP server if the identifier is found in the unsolicited message database.

7. A spam removal agent comprising:

a computer system comprises a finger printing means;

a client database comprising a plurality of dirty POP server addresses, a plurality of dirty POP logins, and a plurality of dirty POP passwords keyed to a clean POP login; and an unsolicited message database;

wherein the computer system waits for a request from a clean POP server, upon receiving the request from the clean POP server, retrieves a dirty POP address, a dirty POP login and a POP password from the client database corresponding to a clean POP login containing in the request, applies the finger printing means to the message to generate an identifier, compares the identifier to the unsolicited message database, and deletes the unsolicited message from the dirty POP server if the identifier is found in the unsolicited message database or passes the message to the clean POP server if the identifier is not in the unsolicited message database.

* * * * *